United States Patent
Wood et al.

(10) Patent No.: US 7,287,011 B1
(45) Date of Patent: Oct. 23, 2007

(54) APPLICATION MANAGEMENT FOR MULTI APPLICATION DEVICES

(75) Inventors: John Wood, San Francisco, CA (US); George Patapis, New South Wales (AU); Rob Douglas, Newport Beach (AU)

(73) Assignee: Keycorp Limited, Chatsworth, NSW (AU)

(*) Notice: Subject to any disclaimer, the term of this patent is extended or adjusted under 35 U.S.C. 154(b) by 862 days.

(21) Appl. No.: 10/070,677

(22) PCT Filed: Sep. 7, 2000

(86) PCT No.: PCT/AU00/01060

§ 371 (c)(1),
(2), (4) Date: Dec. 9, 2002

(87) PCT Pub. No.: WO01/18746

PCT Pub. Date: Mar. 15, 2001

(30) Foreign Application Priority Data

Sep. 7, 1999 (AU) .................................... PQ2689

(51) Int. Cl.
G06F 17/60 (2006.01)
(52) U.S. Cl. .............................. 705/65; 705/1; 705/66; 705/67; 713/176; 713/180; 902/1
(58) Field of Classification Search .................... 705/1, 705/50, 65; 65/66, 67; 713/176, 180; 902/1
See application file for complete search history.

(56) References Cited

U.S. PATENT DOCUMENTS

| | | | |
|---|---|---|---|
| 4,700,055 A | 10/1987 | Kashkashian, Jr. | |
| 5,276,311 A | 1/1994 | Hennige | |
| 5,473,690 A | 12/1995 | Grimonprez et al. | |
| 5,530,232 A | 6/1996 | Taylor | |
| 5,544,246 A | 8/1996 | Mandelbaum et al. | |
| 5,578,808 A | 11/1996 | Taylor | |
| 5,923,884 A | 7/1999 | Peyret et al. | |
| 6,070,146 A * | 5/2000 | Mimata ....................... | 705/13 |
| 6,101,477 A * | 8/2000 | Hohle et al. .................... | 705/1 |
| 6,296,191 B1 * | 10/2001 | Hamann et al. ............. | 235/492 |
| 6,877,094 B1 * | 4/2005 | DiGiorgio et al. .......... | 713/176 |
| 6,883,715 B1 * | 4/2005 | Fruhauf et al. .............. | 235/492 |

FOREIGN PATENT DOCUMENTS

| | | |
|---|---|---|
| AU | 199857487 B2 | 12/1997 |
| DE | 197 18 115 | 5/1998 |
| JP | 1041767 * | 11/2000 |
| WO | WO9828718 | 7/1998 |
| WO | WO98 43212 | 10/1998 |
| WO | WO98 52162 | 11/1998 |

OTHER PUBLICATIONS http://www.cgap.org/portal/binary/com.epicentric.content_management.servlet.ContentDeliveryServlet/Documents/IT_smart_card.pdf, Steve Whelan, date unknown.*

* cited by examiner

*Primary Examiner*—Andrew J. Fischer
*Assistant Examiner*—John Winter
(74) *Attorney, Agent, or Firm*—Darby & Darby; Robert J. Sacco

(57) ABSTRACT

A process and system for managing and leasing memory capacity on a plurality of smartcards and/or smartcard terminals. The capacity is leased to developers of various applications who wish to load their applications on desired smartcards and/or smartcard terminals.

6 Claims, 17 Drawing Sheets

Fig 5.

Privacy Host

Rental Search

Device Type | Model Name
☐ Terminals | ☑ Multos Card | Quantity Required: 1000
☑ Smartcards | ☐ Javacard | Bytes Per Unit Req: 32
 | ☐ OASOS Card | Price Range Per Unit: $50
 | ☐ K711 | Rental Period Req: 12months
 | ☐ K80
 | ☐ K23

Demographic Data (Optional)

☐ 18-25  ☑ 25-40  ☐ 40-85

☐ North Sydney  ☑ South Sydney  ☐ West Sydney  ☐ East Sydney

☐ 20-40k  ☐ 40-60k  ☑ 60-100k  ☐ >100k

SEARCH

Fig 6.

Privacy Host

Rental Search Results

| Criteria | #Matches | % |
|---|---|---|
| Smartcards | 1000 | 100% |
| Multos Card | 1000 | 100% |
| 32 Bytes Per Unit | 854 | 85% |
| $50 Price Range | 1000 | 100% |
| 12m Rental Period | 1000 | 100% |
| Age Group 25-40 | 1000 | 100% |
| Physical Location | 950 | 95% |
| Income Range | 875 | 87% |

The maximum number of devices that can be selected based on your technical requirements are: 854

SUBMIT          SEARCH AGAIN

Fig 8.

Privacy Host

Report

Application: My Loyalty

| Device Id | Owner | Dete Downloaded | Usage Cnt | Length of Stay | Time Left |
|---|---|---|---|---|---|
| | | | | | |
| A04GHJ9 | CBA | 12/06/1998 | 1076 | 12m | 4m |
| A04GHK1 | CBA | 12/06/1998 | 1076 | 12m | 4m |
| A04GHK2 | CBA | 12/06/1998 | 1076 | 12m | 4m |
| A04GHK3 | CBA | 12/06/1998 | 1076 | 12m | 4m |
| A04GHK4 | CBA | 12/06/1998 | 1076 | 12m | 4m |
| A04GHK5 | CBA | 12/06/1998 | 1076 | 12m | 4m |
| A04GHK6 | CBA | 12/06/1998 | 1076 | 12m | 4m |
| A04GHK7 | CBA | 12/06/1998 | 1076 | 12m | 4m |

NEXT ▶

Fig 13.

Privacy Host

| Device Id | Issuer | App Name | Tenant | Proceed |
|---|---|---|---|---|
|  |  |  |  |  |
| A04GHJ9 | Telstra | Debit | ANZ | Yes |
| A04GHK1 | Telstra | Debit | ANZ | Yes |
| A04GHK2 | Telstra | Debit | ANZ | Yes |
| A04GHK3 | Telstra | Debit | ANZ | Yes |
| A04GHK4 | Telstra | Debit | ANZ | Yes |
| A04GHK5 | Telstra | Debit | ANZ | Yes |
| A04GHK6 | Telstra | Debit | ANZ | Yes |
|  |  |  |  |  |

| Search Clear Help | Device Id | Issuer | App Name | Tenant |
|---|---|---|---|---|
|  |  | Telstra |  |  |

DOWNLOAD Selected Entries            NEXT ▶

Fig 14.

Privacy Host

Device Configuration

| Device Id | Issuer | Application | Type | Last Contact | Location | Free Space |
|---|---|---|---|---|---|---|
| A04GHI9 | Telstra | Debit | K711 | 1/07/1998 | N. Ryde | 45000 |
| A04GHI9 | Telstra | Credit | K711 | 1/07/1998 | N. Ryde | 45000 |
| A04GHK1 | Telstra | Debit | Multos | 1/12/1998 | N/A | 15000 |
| A04GHK2 | Telstra | Debit | Multos | 1/12/1998 | N/A | 15000 |
| A04GHK3 | Telstra | Debit | Multos | 1/12/1998 | N/A | 15000 |
| A04GHK4 | Telstra | Debit | Multos | 1/12/1998 | N/A | 15000 |
| A04GHK5 | Telstra | Debit | Multos | 1/12/1998 | N/A | 15000 |
| A04GHK6 | Telstra | Debit | Multos | 1/12/1998 | N/A | 15000 |
|  |  |  |  |  |  |  |

| Search Clear Help | Device Id | Issuer | App | OS | Last Contact | Location | Free Space |
|---|---|---|---|---|---|---|---|
|  |  | Telstra |  |  |  |  |  |

NEXT ▶

Fig 15.

Privacy Host

Lease Agreements

| Lease Id | Issuer | Application | Tenant | Start | End | #Of Devices |
|---|---|---|---|---|---|---|
| 00001 | Telstra | Debit | NAB | 1/07/1998 | 1/12/1998 | 10000 |
| 00002 | Telstra | Debit | CBA | 1/07/1998 | 1/12/1998 | 45000 |
| 00003 | CBA | Phonecard | Telstra | 1/08/1998 | 1/02/1998 | 15000 |
| 00004 | CBA | Loyality | Telstra | 1/08/1998 | 1/02/1998 | 15000 |
| 00005 | CBA | Coke | Coke | 1/07/1998 | 1/07/1999 | 15000 |
| 00006 | ANZ | Loyality | Telstra | 1/08/1998 | 1/02/1998 | 15000 |
| 00007 | ANZ | Coke | Coke | 1/07/1998 | 1/07/1999 | 15000 |
| 00008 | ANZ | Phonecard | Telstra | 1/08/1998 | 1/02/1999 | 15000 |
|  |  |  |  |  |  |  |

NEXT ▶

APPLICATION MANAGEMENT FOR MULTI APPLICATION DEVICES

TECHNICAL FIELD

The present invention relates to the management of applications resident on multi application devices, for example smartcards and smartcard terminals. It has particular but not exclusive application to situations where the device owner and the provider of applications are arms length parties.

BACKGROUND

Smartcards are increasingly used and proposed to be used in many different applications. By smartcard is meant a device including processing capacity intended for use in association with terminals or similar infrastructure. The smartcards may operate by direct electrical contact or via a wireless mechanism.

Advances in technology, and in particular the amount of processing power and memory resident on reasonably priced smartcards, have seen proposals advanced for multi application smartcards. Such a smartcard is one where there is not only a single software application, for example a credit card application, but a variety of other applications on the same card. These may in principle include access applications, telephone applications, airline applications, rental car applications, loyalty schemes, and many others. A particular advantage of having many applications resident on a smartcard is that the user can minimise the number of separate cards which need to be carried. It also allows the issuer of the cards to derive revenue from having applications from third parties resident on the card, and to defray the capital cost of issuing the cards. For example, an airline may issue a smartcard as part of a loyalty scheme, and receive revenue by allowing a financial services institution to place a credit card application on the card.

Multi application smartcards are a means by which applications can be loaded which have functionality well beyond the traditionally foreseen smartcard applications, as it is possible for quite small applications to be economically provided on the card.

For example, U.S. Pat. Nos. 5,530,232 and 5,578,808 to Taylor disclose multi application smartcard systems.

Another aspect of multi application systems is the requirement for terminals to appropriately interact with the various applications. Hence, if an application is to be loaded onto a card, then there needs to be a mechanism to provide the corresponding terminals with an interacting application.

Multi application smartcard schemes present a number of specific problems, particularly where various parties have applications on the card which may contain confidential information, encryption keys or details which they do not wish disclosed to the other applications resident on the card. It is necessary for the application provider in these cases to trust the arrangements between it and the issuer, both commercially and technically, so that unauthorised information is not disclosed. Another issue for the card owner and application providers is to ensure that applications on the card do not interfere with each other, for example by overwriting memory in use by another application. A further issue for the issuer is that in many cases they will wish to ensure that inappropriate or competing applications are not loaded onto the card. For example, a financial institution issuing a smartcard is unlikely to desire that the applications of other financial services providers be loaded onto the smartcard.

U.S. Pat. No. 5,544,246 to Mandelbaum et al describes a particular type of smartcard operating system which allows different service providers' applications to coexist on a smartcard. Essentially, this proposes a UNIX type solution, where each user has control over a particular sub-directory in the card operating environment. The issuer, or super user, has only limited ability to access the sub-directories associated with other application providers. A particular problem with this arrangement is that it leaves control of which applications are loaded to the card issuer. This means that the card issuer needs to be directly involved with each application which is loaded on the card. It does not provide a mechanism for loading applications onto cards owned by different issuers. A further issue is that the application providers are entirely reliant on the security and integrity of the card issuer.

It is an object of the present invention to provide a system, which is independent of the card or terminal operating system and independent of the issuer, which can control loading and removal of applications, so as to facilitate an orderly and accessible market for parties wishing to load applications onto cards owned by one or more issuers.

SUMMARY OF THE INVENTION

According to one aspect, the present invention provides an independent software system which enables the remote loading and unloading of applications. In operation, a control server maintains details of the devices which the system controls, a set of possible applications which can be loaded onto the devices, and a control means which determines which applications are permitted or required to be loaded onto which devices. When a device is brought on line with the server, for example by a customer inserting a card into a terminal, the terminal sends a signal to the control server which identifies the device. The control server matches the identification to its records, and determines whether a new application needs to be loaded, any of the existing applications need to be updated, or if an application needs to be removed. On the basis of this information, the control server and the terminal then cooperate to load or unload applications onto the smartcard.

It will be appreciated that in some cases the application may be stored on the terminal and downloading simply authorised by the control server. In some cases, the terminal may act as a bare intermediary and simply load onto the card applications sent directly from the control server.

At another level, in order to facilitate the market, the inventive system acts as an intermediary. A particular application provider may, for example, provide details of suitable or desired demographics to the system, and general details about the type of application proposed. The system will then determine the various sets of cards to which these criteria may be applicable. It is noted that these may spread across many different issuers, or be from a single issuer. The system then passes the specific requests to the card issuers, who then propose suitable contractual terms which are agreed with the application provider. A specific contract is entered into between the application provider and the issuer, which is administered by the intermediate party. Once this contract is in force, the control information is updated in the control server, and when next the cards are brought on line, the appropriate applications are downloaded. It is emphasised that the present invention provides a very flexible approach. For example, it readily facilitates time limited loading—an application may be purely an advertisement for an upcoming event. The term application in the context of this invention encompasses files, displays and advertising messages.

The application provider may pay for this application to be downloaded so that it is displayed when the terminal is accessed by the card, for example, for a month. At the end of this period, the control server can remove this application from the card when next it is brought on-line.

The present invention further provides various novel reporting structures and systems. For example, it facilitates reporting to an issuer what applications are loaded onto which cards, as well as reporting to an applications provider how many of its applications are loaded, on what types of cards, and the "rent" it is paying for the relevant space.

It will be appreciated that references to cards could equally be to terminals or other similar devices—indeed, in many cases both would need to be controlled.

The present invention is based upon the principle of managing the non-volatile memory space on the smartcard as if it were a piece of real estate. The control system acts as the real estate agent. The application for those wishing to rent space approach the real estate agent who then brokers a deal with the issuer. The agent then becomes responsible for ensuring rent is appropriately collected, and that the tenants do not interfere with each other.

This is a very powerful paradigm, as it allows for the conventions and processes evolved over a long period for lessees and owners of premises to be applied to the residence of applications on smartcards. Accordingly, concepts familiar to business managers can be applied and the process managed on a fair and equitable basis, to the benefit of both the application providers and the device owners.

BRIEF DESCRIPTION OF DRAWINGS

An embodiment of the present invention will now be described with reference to the accompanying figures, in which:

FIG. 5 shows a sample rental search request screen;

FIG. 6 shows a sample rental search results screen;

FIG. 8 shows a sample application report screen;

FIG. 13 shows a sample screen reporting applications to be downloaded;

FIG. 14 shows a sample screen reporting configuration for selected devices;

FIG. 15 shows a sample screen reporting lease agreements;

DETAILED DESCRIPTION OF THE PREFERRED EMBODIMENT

It will be appreciated that the present invention is broad in scope and application, and that it may be implemented in diverse ways yet provide the same functionality. One illustrative embodiment will be described below. The following table sets out some of the analogies between the realtor/property interaction and the processes for use in multi use smartcard systems.

| Realty Term | Application Lease Control System (ALCS) function analogy |
|---|---|
| Owner | Device Issuer, e.g. card issuer |
| Realtor/Agent | ALCS |
| Lessee/Tenant | Application owner |
| Submitting new real estate | Issuer advising updated list of e.g. cards issued to ALCS |
| Submission of lease request | Application provider requesting access to certain space or certain cards. |
| Search for suitable real estate | ALCS - mediated database search for cards meeting demographic requirements |
| Rental property | Specified space on multi-application smartcards or terminal. |

Figure 1:
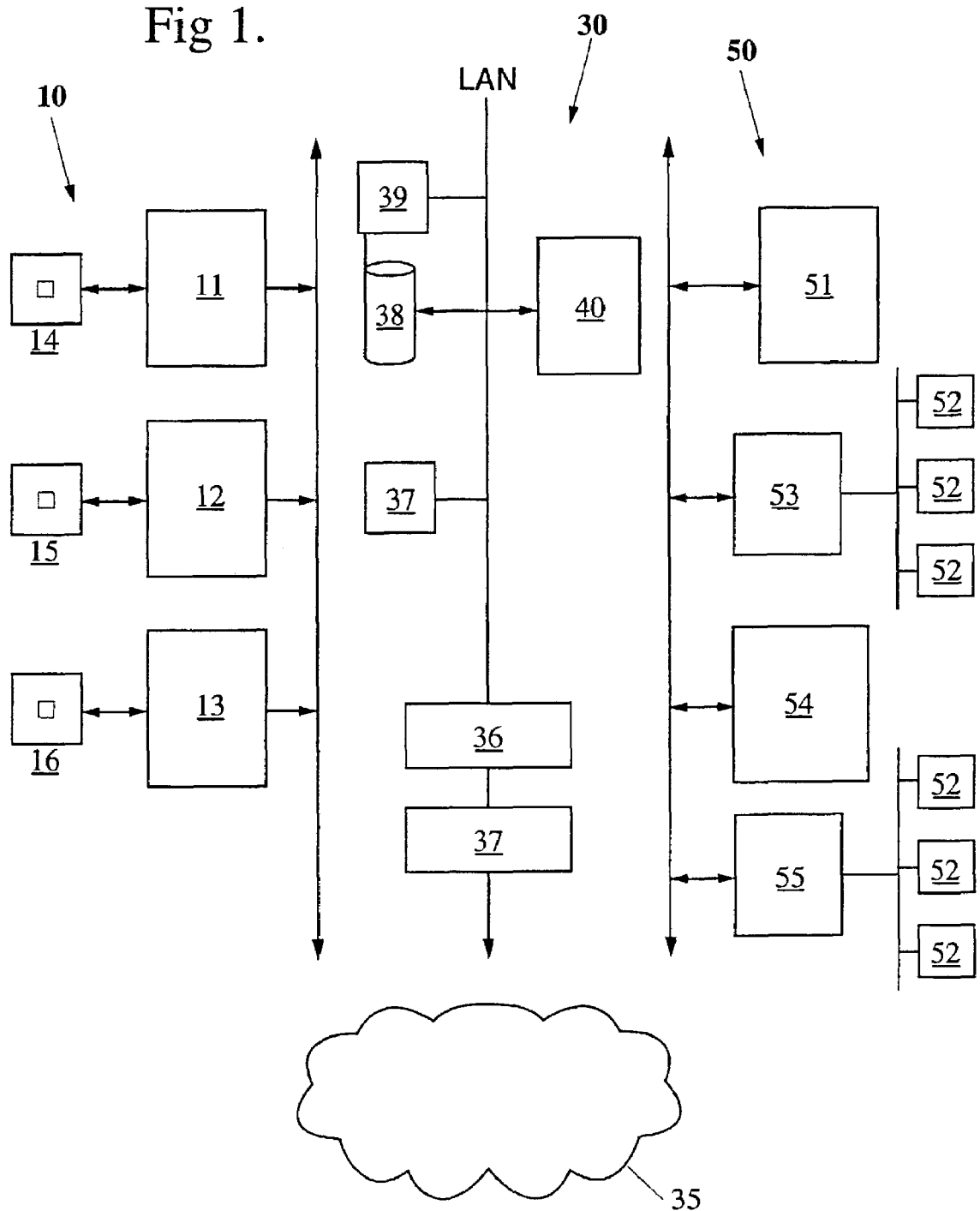
FIG. 1 is a general overview schematic diagram showing the context of the inventive system.

From FIG. 1, it can be seen that the present invention provides an application lease control system (ALCS) 30 lying between the various devices, collectively referenced as 10, and the various participants having a stake in the effective operation of the system, referenced collectively as 50. Devices 10 would generally include a large number of terminals, illustratively referenced as 11, 12, 13, which may be of different manufacture and operate under different operating systems. At each terminal, smartcards may be utilised which are compatible with the respective terminal, using for example either the Multos scheme 14, Javacard scheme 15 or OSSCA scheme 16. Each terminal is connected to its normal host, one of the participants 50, as well as to the application lease control system 30.

The participants may include the owner of the card, the card issuer 51, or in our analogy the real estate owner, for example a bank; developers of applications 52; the card tenants 53; the terminal issuer/owner/acquirer 54; and terminal tenants 55. It will be appreciated that some of these will have commercial relationships outside the context of the present invention—for example, the application providers will be contracted by card and terminal issuers 51,54 and by tenants 53,55 to provide the necessary applications. The terminal owners 54 and card issuers 51 will have appropriate arrangements to facilitate the operation of the card issuer's 51 cards in the terminals of at least some of the terminal owners 54.

The latter arrangements are well known and commonly implemented. It will be appreciated that a set of suitable legal agreements will need to be concluded prior to any party becoming a participant in the system, so as to define the respective legal rights and obligations of the parties. The ALCS 30 and interacting software need to operate in a manner consistent with such agreements if the potential of the present invention is to be fully realised. The present invention is concerned with managing the available capacity of both cards and terminals, performing a role analogous to a real estate agent or realtor to set up and manage relationships between device issuers and tenants, or owners of applications.

A variety of interfaces must be provided to allow the various participants 50 to interact with the ALCS 30. Thus, appropriate interfaces need to be provided for the operators of the ALCS 30 and its components; interfaces for device issuers 54, 51; and interfaces for application providers, who may be tenants or their application developers, to deposit their applications for distribution to devices. The ALCS will also need to provide suitable interfaces to the participants, for example card issuer interface, device tenant interface, and terminal issuer. The ALCS 30 will also need to interface with the software running on the respective devices 10. Communications may be by any suitable mechanism between ALCS 30, the devices 10, and participants 50, shown as cloud 35. These may include internet, mobile data networks, leased lines, DDN, POTS or other analogue networks or X25.

The ALCS 30 may be implemented by any suitable hardware. For example, FIG. 1 shows the server 40 implemented via an NT server based system. Reports of various types can be generated, as described in more detail below, shown as block 37. Server 40 is in communication with a relational database 38, preferably implemented on a suitable server 39. It will be appreciated that the type and scale of the hardware will be dependant on the number of devices and applications which are managed by the system.

In most areas where the ALCS 30 can be deployed, it will need to be able to support a range of different smartcard and terminal hardware devices. This is a consequence of the prevailing smartcard environment envisaged for the near future. Preferably, these will conform to prevailing standards, for example the Application Protocol Data Unit and Inter-industry Commands of ISO7816-4. The terminals 11-13 need to have, as a minimum, basic modem functionality, and sufficient memory to run the software to interface with ALCS 30. The present invention does not provide an operating system—it is, however, necessary that the ALCS 30 have interfaces to each of the operating systems with which it operates, and the necessary accesses and authorisations, so that it can issue appropriate commands to the card and device operating systems to load and unload applications and related tasks. It need not, and for security reasons it is preferred that it does not have authorisation to, for example, alter PIN numbers, alter issuer cryptography, or monitor in any way the substance of communications from the applications to any external parties with which they communicate.

One way to implement the ALCS 30 to allow it to perform its lease management tasks, is for card agent software to be loaded on each participating smartcard. This software needs to provide a consistent interface to the terminals, so that each terminal does not require different software to communicate with and utilise the ALCS 30 functionality on each type of smartcard.

A preferred implementation, however, is to not require any special software on each card, but rather to provide appropriate terminal interfaces, so that ALCS 30 instructions are implemented using the commands within each card's operating system. Thus, the ALCS 30 via the terminal does not usurp the normal operating system protocols and interfaces—it simply utilises them to perform the tasks required for the operation of the ALCS.

Figure 2:
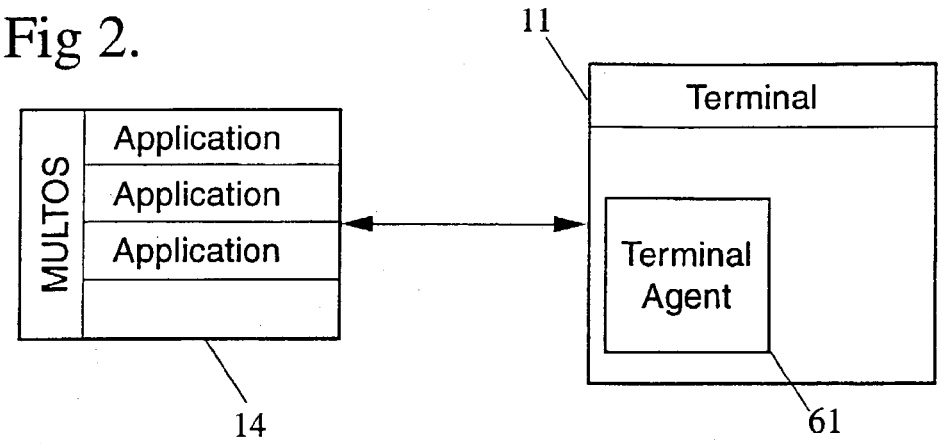
FIG. 2 is a block diagram illustrating the software components of the cards and terminal according to the inventive system.

Terminal 11 includes various software components (FIG. 2) necessary to perform the ALCS tasks required. It is noted that in addition it is loaded with the software necessary to perform its normal tasks, for example as a financial services terminal or other smartcard reading device. The ALCS functionality is an application provided in addition to the existing software, not a replacement for it.

A terminal agent 61 is required to provide a consistent interface to terminal applications for access to the ALCS 30 functionality of smartcards, regardless of the type of card inserted.

The Terminal Agent 61 also provides a consistent interface for managing all terminal functionality to the remote ALCS back-end server.

The system will conveniently provide a collection of standard application groupings and a set of interfaces that have to be met by each application belonging to a group.

The application groups may include, for example:

Payment Applications which handle different forms of payment such as Credit, Debit, Stored Value etc, Communication applications which facilitate external communications and network protocol conversions, Advertising Applications for displaying and manipulating advertising messages on a terminal display, Management Applications to facilitate device management such as configuration and gathering of statistics, Identification Applications which assist in authenticating a user, handle the personal details and security checks, Directory Applications which permit the cataloguing and searching of the available applications on a device, Security Applications which can place a terminal into a number of different security modes and Ordinary/Legacy applications that do not co-operate with any other application on the system and operate in a legacy fashion.

Applications can be grouped into a collection. For example a utility company, a bank and an insurance provider may wish to bundle their applications for distribution together. They will be identified by a collection trading name. If a terminal detects that a smartcard with a known X-Collection identifier has been inserted, it will run the specific X-Collection menu. Alternatively, the terminal may display a menu structure and the selection of all applications that are loaded onto it.

Software interfacing to the Issuer host will assist in automating such things as submitting new real estate, confirming acceptance of lease requests by tenants and anything else that would have to be done manually by Issuer operators via ALCS graphical interfaces.

Software to interface to application providers would assist in the automated searching of real estate and submission of lease requests, automatic submissions of applications to the rental property, etc. This would reduce the need for manual browsing by providers of the ALCS Application Provider GUI screens.

To improve the ability of the ALCS software to communicate with devices and in particular smartcards, an interface to transaction acquirers is desirable. Via this interface the ALCS can notify a transaction acquirer when a particular device comes on-line, to tell the device to also contact the ALCS for management purposes. This assists the flexibility and functionality of the overall ALCS solution.

Note that in many cases the transaction acquirers may be issuers.

The ALCS must co-exist in a mixed, legacy environment of various communication protocols and networks. For example, some of the interfaces include EFTPOS, AS2805, HDLC, Synchronous networks and SNA Networks.

Communication speeds end-to-end in practice vary dramatically starting from only 1200 bps. Also, much of the front-end equipment (terminals/smartcards), is not necessarily on-line but rather comes on-line only when a transaction occurs. This ALCS will need to accommodate this in any implementation.

ALCS Functions

The ALCS functionality, can be grouped into the following areas:

Interfacing to Device Issuers and Application providers,
Device Real Estate Management,
Application Management,
Security Management,
Billing and
Advertising Management.

Interfacing to Device Issuers

Smartcard issuers and/or terminal issuers, require an interface to the ALCS in order to inform the ALCS of available real estate for leasing and their specific requirements as far as tenants are concerned. The further illustration of the present invention will be with respect to the applicants Privacy Host implementation. It will be appreciated that this is only one way in which the invention can be implemented.

An interface can vary in sophistication, from a simple hand signed letter of agreement and an issuer supplied floppy disk with the device details to a fully automated system. In an automated system, the issuers' computers directly interface and communicate with the ALCS for the purpose of informing the ALCS of real estate availability.

Issuers will in addition provide classification for their devices. Classifications can be based on demographics (age, income level etc.) or any other issuer choices. These classifications will be used by application providers for device selection.

Figure 3:
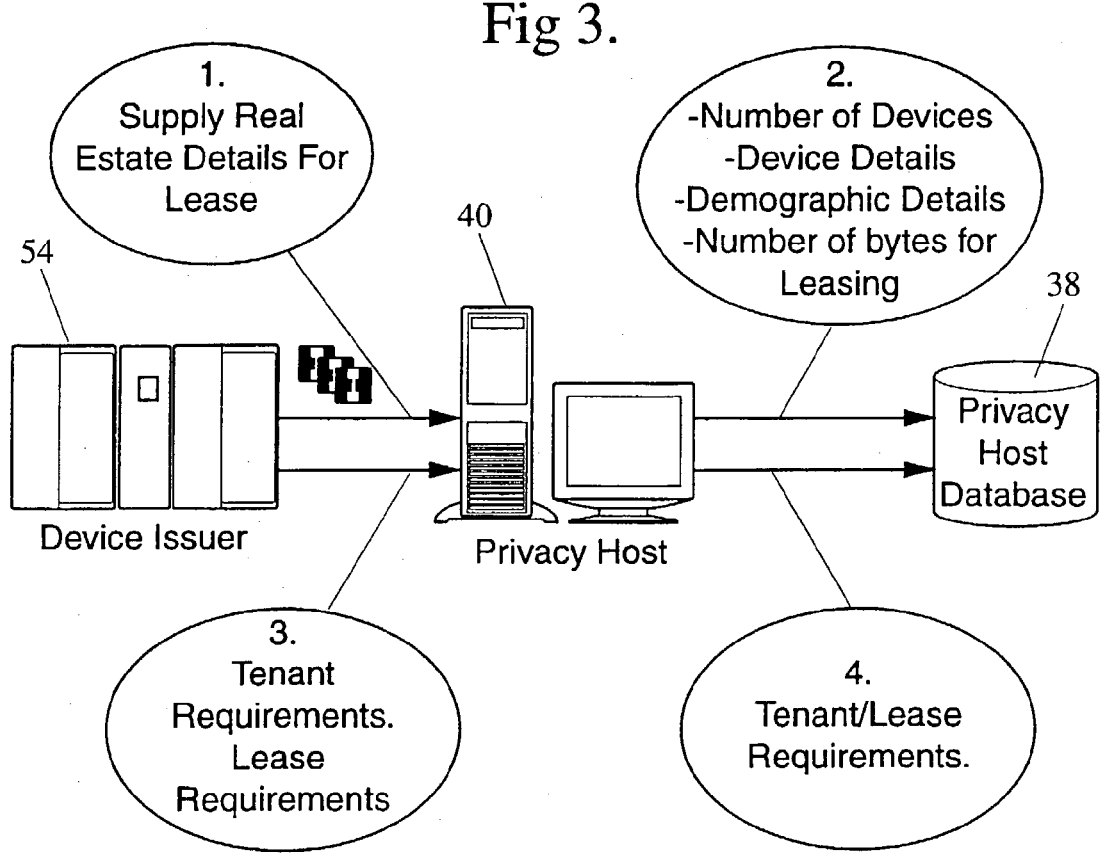
FIG. 3 is a schematic diagram showing the interactions required when a device issuer provides space on one or more on one or more devices for rent.

FIG. 3 illustrates the components of the process of a device issuer providing real estate for lease. The device issuer 54 supplies details of the available real estate, or devices, to the Privacy Host server 40. This then supplies the relevant details for secure storage on the Privacy Host database 38, including for example the number of devices, the details of the devices, the relevant demographic details, and the number of bytes of memory available. The device issuer 54 also provides specific tenant requirements to the privacy host server 40 which are then stored in the database. For example, the issuer may not want any other travel applications loaded, as this would compete against its primary application, but may be particularly interested in financial services applications being loaded.

In addition Device Issuers will wish to see the status of their real estate at any point in time. This information can be provided by the ALCS in several ways, such as periodic reports, a WWW on-line interface or direct access between ALCS database and the Device Issuer database.

Interfacing to Application Providers (Device Tenants)

Potential tenants—those wishing to provide applications for the devices need to be able to search for the appropriate real estate that suits their demographic or other need and supply the applications for down-loading and occupation of the real estate.

The interfaces the ALCS needs to provide to prospective tenants include software to locate the required real estate, software to apply for a lease and submission of the applications. It is preferred that a facility for application signing and Tenant authentication is provided.

These interfaces may range from graphical WWW screens to automated search and submit mechanisms between the ALCS and Application Providers' computers.

Figure 4:
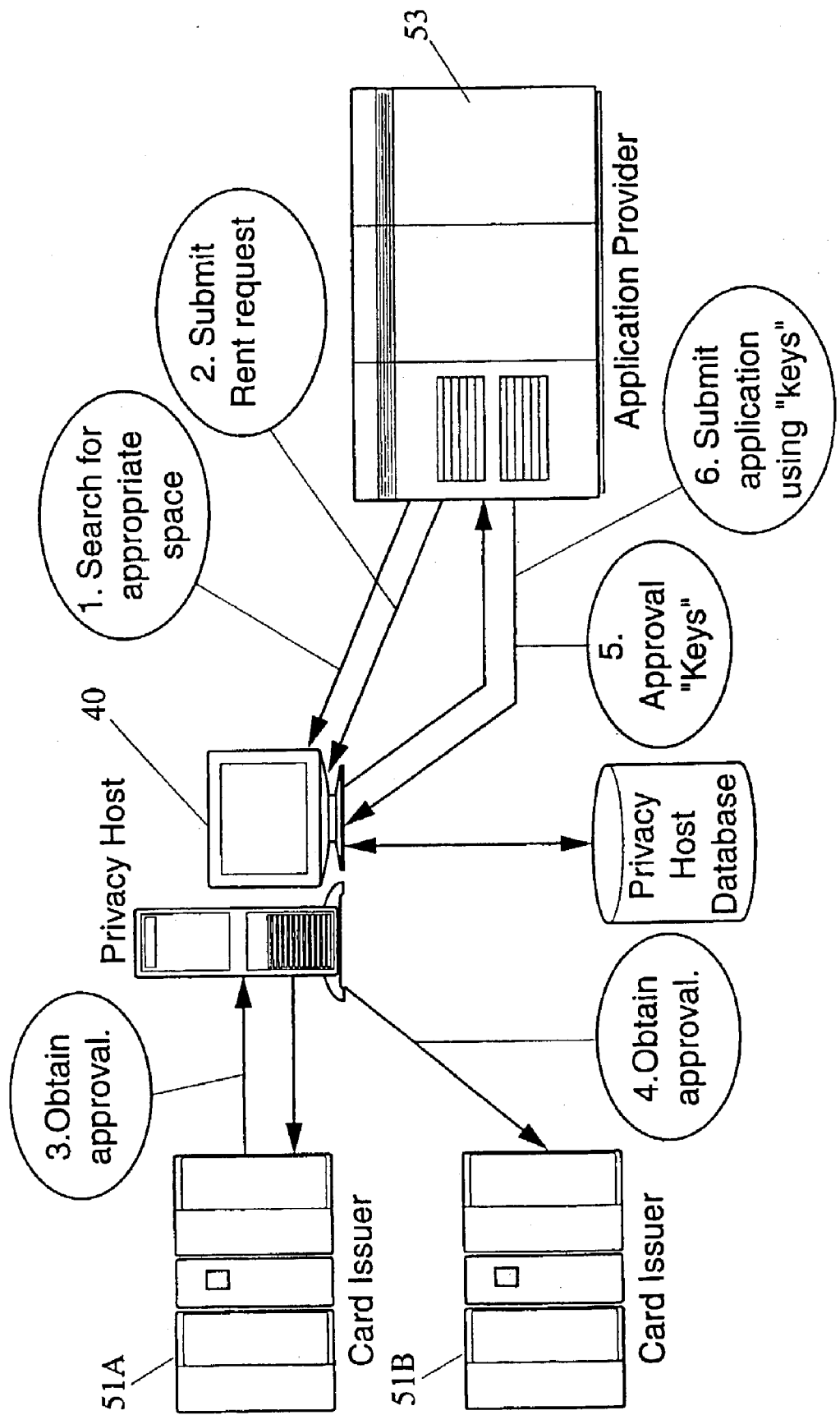
FIG. 4 is a schematic diagram showing the interactions required when an application provider wishes to rent space on one or more devices.

FIG. 4 illustrates a process in which an application provider 53 requests cards for rent. Application provider 53 logs on to the Privacy Host system 40. Using search criteria and particular demographic details they select the type and number of cards that are of interest. A sample screen for this purpose is shown in FIG. 5. Using a simple GUI, various options as to price, device type, demographics, memory requirements, etc can be entered.

FIG. 6 illustrates a report screen generated by the Privacy Host system 40 after searching the Privacy Host database 38. This shows the number of hits on the various criteria selected by the application provider 53. At this stage, the application provider 53 could elect to alter the criteria and redo the search, if insufficient hits were found. On the basis of the report, the application provider 53 can decide to submit a rental request, by clicking the submit button. This is then sent to the one or more card issuers 51A, 51B whose cards meet the criteria. It is emphasised that the present invention is readily implemented in a multiple issuer, multiple operating system environment, allowing for real estate to be rented which best meets the criteria of the application provider 53, whether this is all on cards from one issuer or on only a few cards from many issuers.

Figure 7:
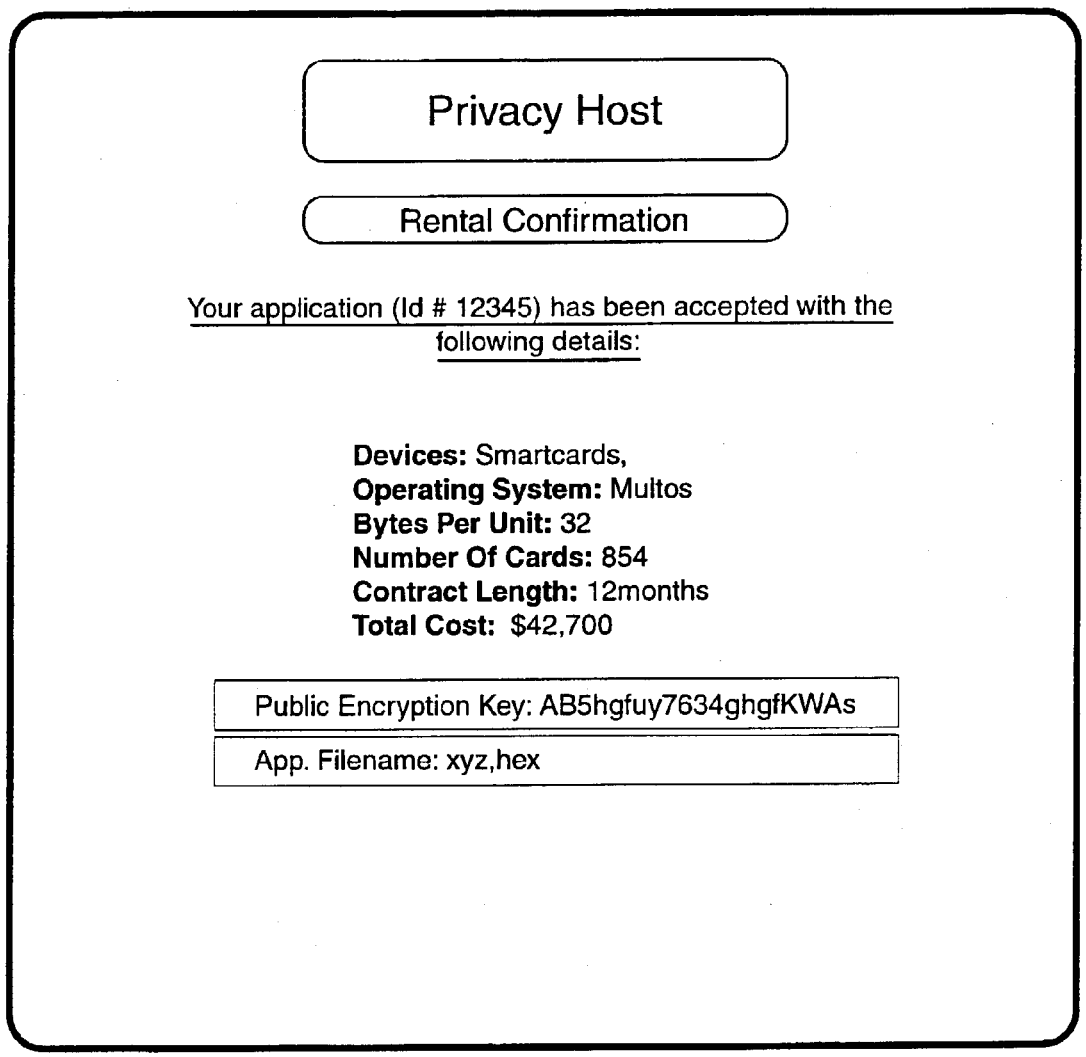
FIG. 7 shows a sample rental confirmation screen.

Once the approvals have been given, privacy host sends a confirmation to the application provider, for example as shown in FIG. 7. This may conveniently include a public key for a public/private key encryption system, which the application provider 53 uses to encrypt the applications and then submit these to the Privacy Host system 40. The applications can then be downloaded as the cards in question come online, as will be discussed further below.

Device Real Estate Management

This is one of the central functions of the ALCS. There is a need to be able to manage the space on each device so as to enable multiple applications from different parties to be resident, without interfering with each another. The real estate must be allocated and de-allocated dynamically to the different participants in the scheme. The participants are acting in the role of "device tenants" by supplying their applications to reside on the devices.

Figure 16:
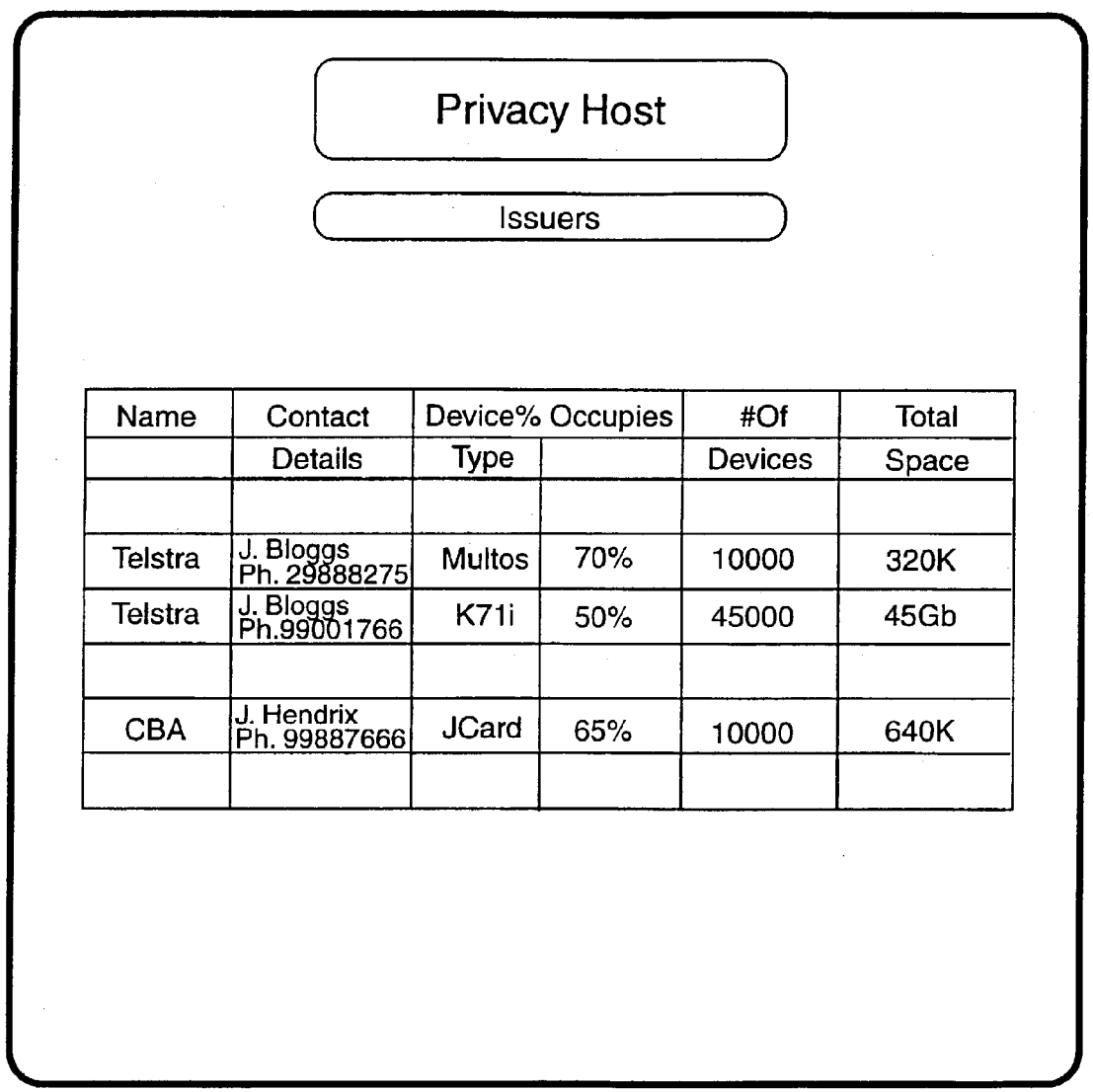
FIG. 16 shows a sample screen reporting devices by issuer.
Figure 17:
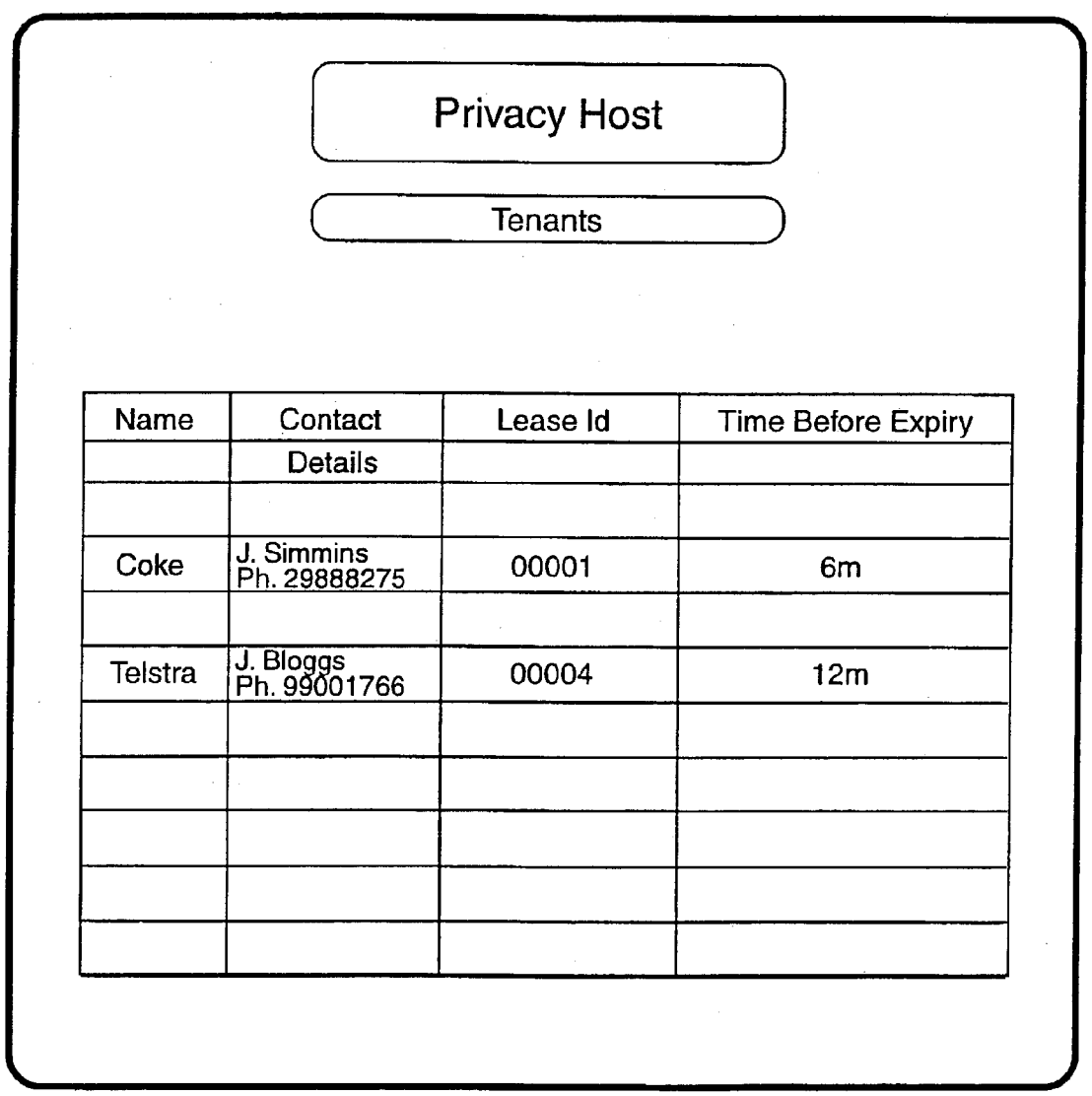
FIG. 17 shows a sample screen reporting tenants current on the system.
Figure 18:
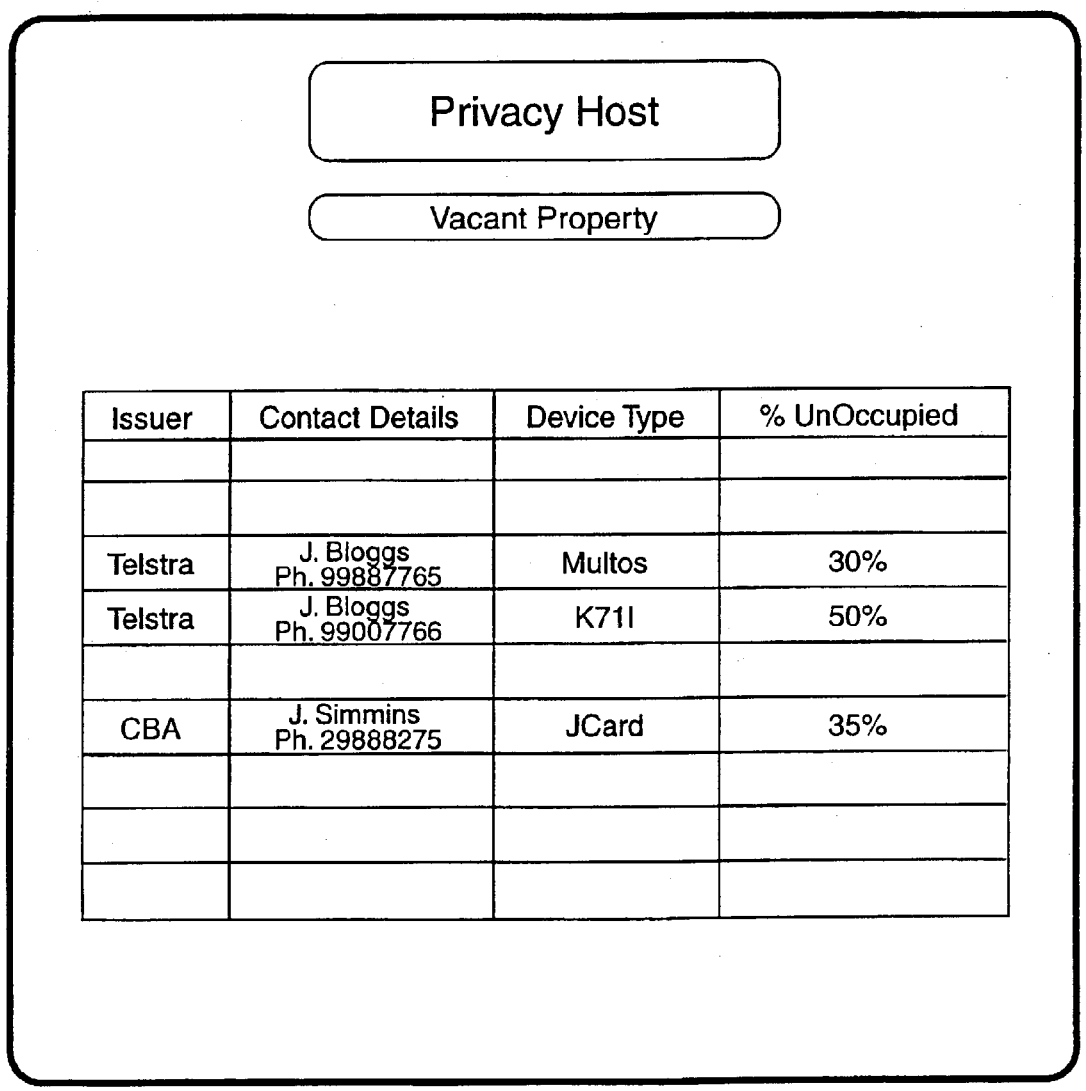
FIG. 18 shows a sample screen reporting vacant property on the system.

The system will also need to keep track of such things as number of vacancies on each device, expiry of lease for an application, length of tenancy of each application and similar information. For example, FIG. 15 shows a sample screen reporting lease agreements, providing details such as term, tenant, and number of devices; FIG. 16 shows a sample screen reporting devices by issuer which are controlled by the ALCS; FIG. 17 shows a sample screen reporting tenants current on the system; and FIG. 18 shows a sample screen reporting vacant property on the system.

The participants may also require various other reports, which can be readily provided using standard database query and reporting software, for example:

An issuer makes changes to their entries, removing, adding and modifying real estate as they see fit.

An issuer wishes to see a breakdown of the number of devices he has submitted for lease.

An issuer wishes to see how many of their devices have been leased and to whom.

An issuer searches for devices based on technical criteria such as device operating system and demographic criteria such as physical location.

A device issuer wants to query know how much real estate is still vacant.

An issuer requests information on the most popular devices by usage.

An issuer requests information which shows the most popular physical device locations.

An issuer requests information showing which leases are due to expire and what property will be made vacant.

An application provider requests information listing the whereabouts of their applications with the information being grouped by physical location, real estate category and demographic breakdown.

An application provider requests information on the issuers they are dealing with.

An application provider requests information on their leases including length of lease and how much time before certain leases expires.

An application provider wishes to find out how many times their applications have been used on each device.

The operator lists all Issuers that are participating in the ALCS together with information on their Real Estate.

The operator lists all tenants together with information on their status.

The operator lists all the property that is currently vacant.

The operator extends the lease for an application on a given set of devices.

An operator retrieves information and determines who the best Issuers and tenants are.

An operator examines information on tenant lease requests that could not be fulfilled.

An operator requests information to identify if any problems occurred when attempting to occupy property by applications.

An operator requests information to identify if any problems occurred when trying to vacate property by applications.

Device Rebuilding

If a smartcard is lost or damaged, the ALCS is preferably able to rebuild and re-install on the real estate all the applications that were previously present using its database or links to external Application provider databases. These applications will be in a brand new state. Restorations of any loyalty points, transaction information or any other data that was accumulated over time, will need to be done by the application provider.

It is important to note that whilst preparing a batch of cards for issuing, they usually go through the following processing steps:

1. Initialisation,
2. Profile Preparation and
3. Personalisation.

Initialisation is the process where all the common data of a batch of cards is placed onto them. Profile preparation is the phase where an Issuer associates cards to business organisation. Particular applications are loaded onto the card as the Issuer sees fit. Personalisation is the process where cardholder specific information is loaded onto a card. This phase associates a card to a user. The ALCS initially will not replace this functionality but ensure that after a lost device is replaced with a new initialised and personalised device, that it can accurately replace the additional applications that were residing on the device at the time of loss.

Application Management

The system manages the applications that will reside on the devices including:

Distribution of applications,
Lifespan of applications,
Application Providers submitting applications for devices,
Storage of applications,
Version control,
Tracking of applications through their lifecycle,
Loading and Unloading of applications.

Different applications can execute on different devices thus the ALCS needs to be able to manage this mix and match of application to device hardware architecture. FIG. 8 shows a sample screen report for a particular application, providing details of which devices it is loaded onto, the period of lease remaining, the device owner, and the date the application was loaded onto each device.

Figure 9:
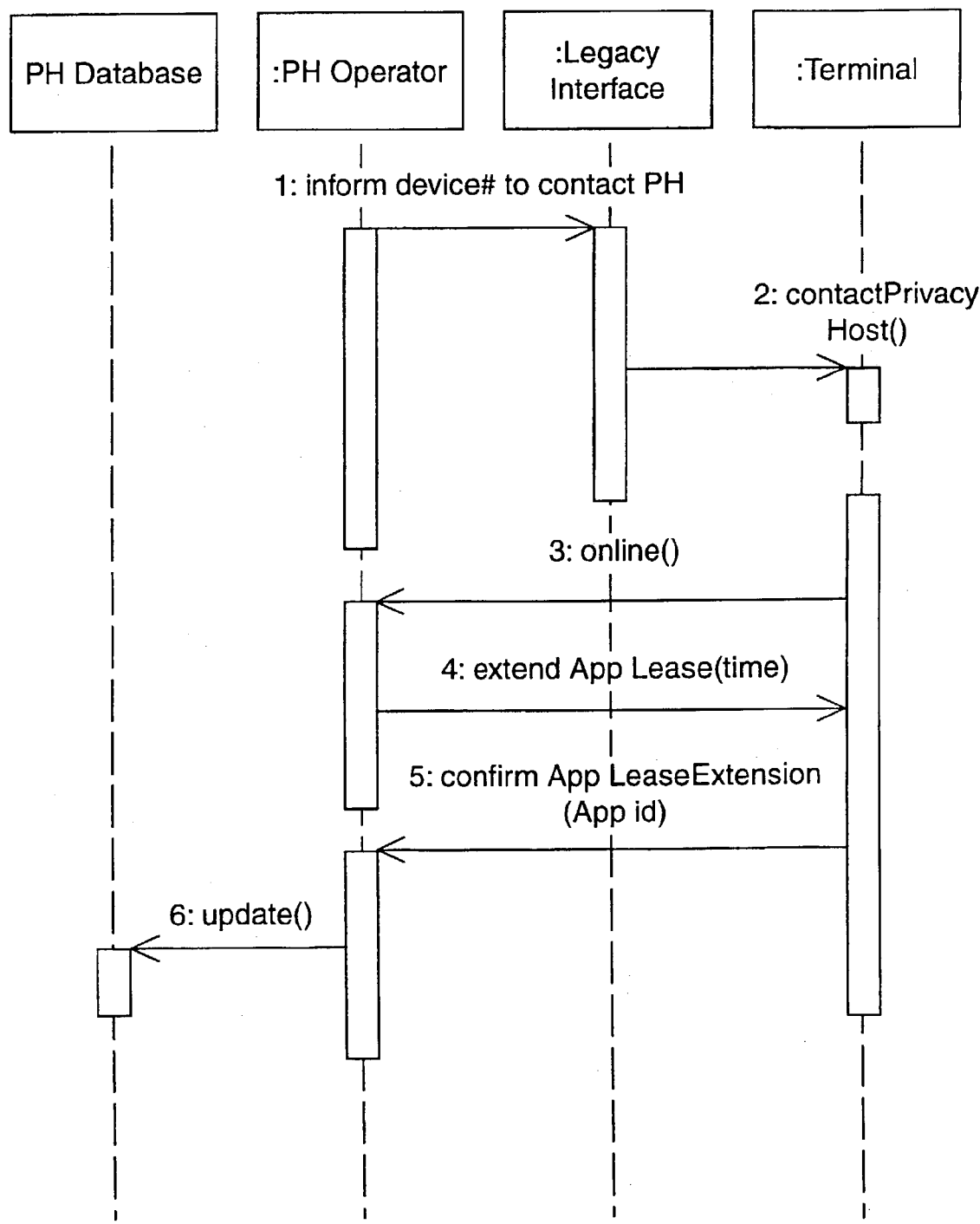
FIG. 9 is a schematic illustration of the interaction of devices when an application provider wishes to extend a lease.

FIG. 9 illustrates the interactions necessary when the operator of the Privacy Host system wishes to extend the lease of space for an application on a given group of devices. The diagram shows various elements of the system—the Privacy Host database, the Privacy Host operator, the existing interface (legacy interface) to the terminal, and the terminal—as vertical lines, with time increasing down the graph and communications shown as lines between the elements. The operator sends a signal to inform the given device that it should contact Privacy Host, to the legacy interface, which is then forwarded to the terminal. When the terminal goes online, it signals this to the Privacy Host operator, which then sends a signal extending the application lease to the terminal. The terminal confirms this to the Privacy Host operator, which then updates the Privacy Host database.

Figure 10:
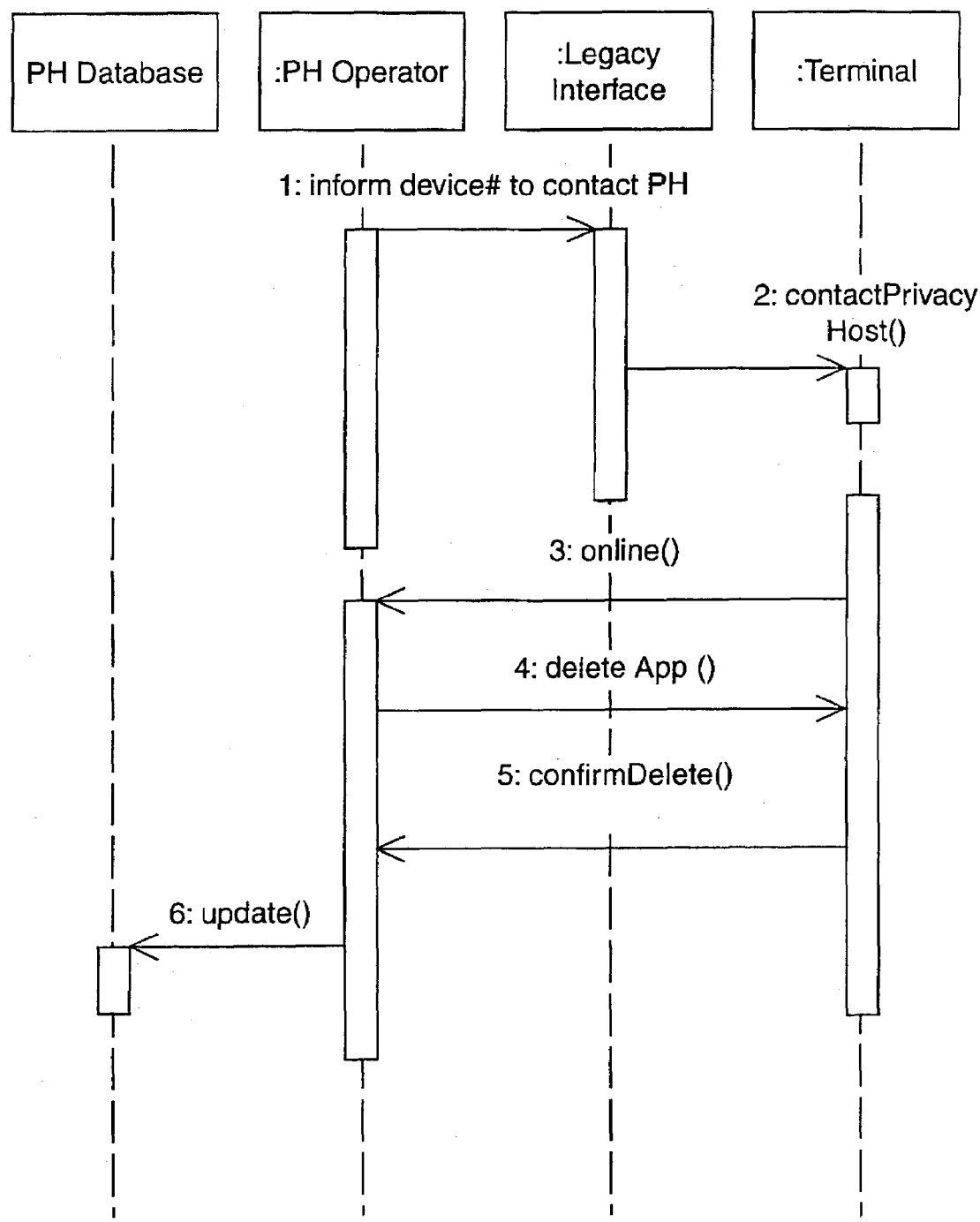
FIG. 10 is a schematic illustration of the interaction of devices when a request to delete applications is sent.

FIG. 10 illustrates, in a similar way to FIG. 9, the interaction of devices when a request to delete applications is sent. The operator sends a signal to inform the given device that it should contact Privacy Host, to the legacy interface, which is then forwarded to the terminal. When the terminal goes online, it signals this to the Privacy Host operator, which then sends a signal deleting the application lease to the terminal. The terminal confirms this to the Privacy Host operator, which then updates the Privacy Host database.

Figure 11:
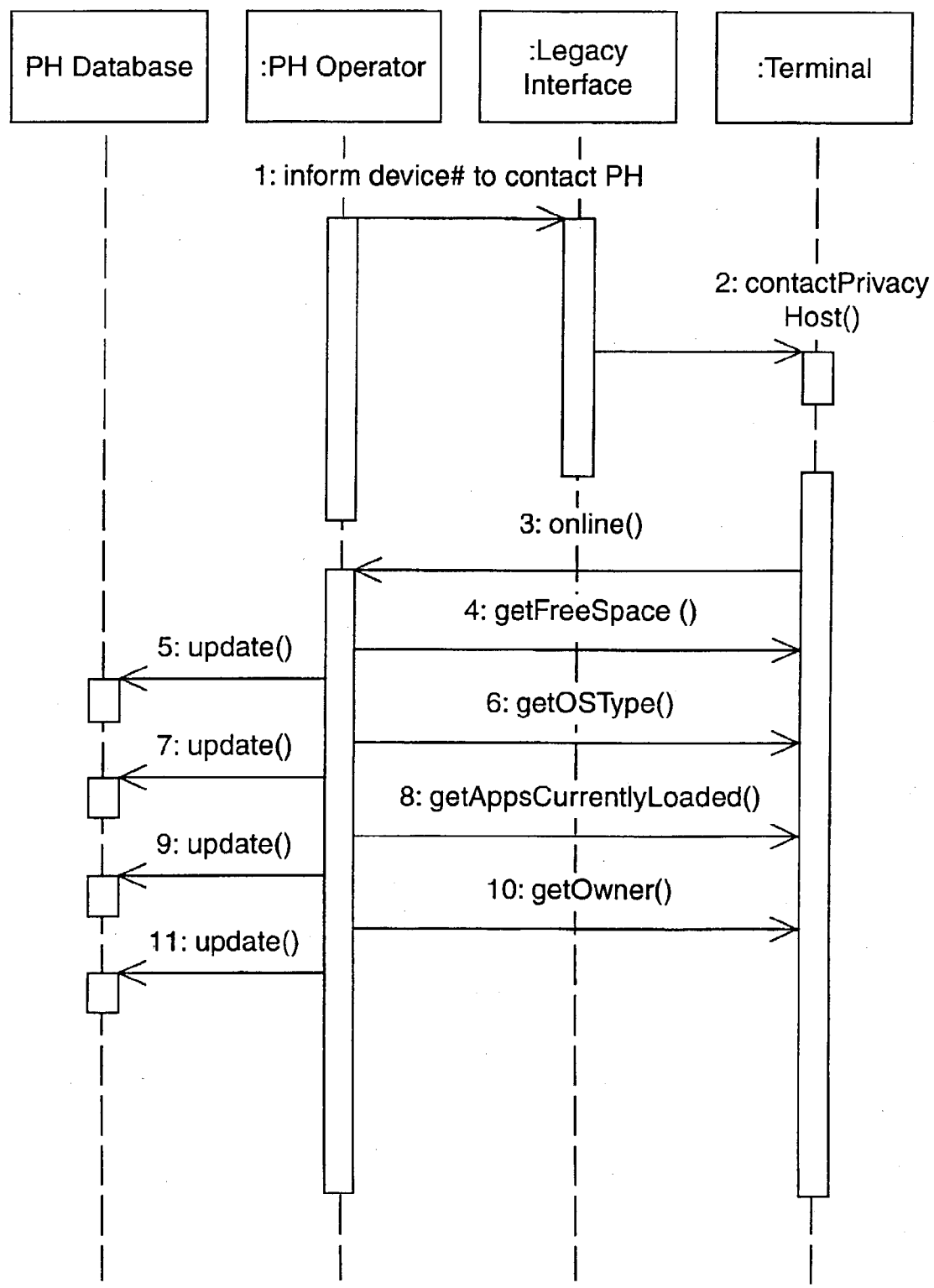
FIG. 11 is a schematic illustration of the interaction of devices when an operator wishes to obtain details of a device.

FIG. 11 shows the interaction of devices when an operator wishes to obtain details of a device. The operator sends a signal to inform the given device that it should contact Privacy Host, to the legacy interface, which is then forwarded to the terminal. When the terminal goes online, it signals this to the Privacy Host operator, which then sends successively signals requesting the amount of free space, the current operating system, a list of currently loaded applications, and the card owner. It will be appreciated that the queries could vary if required. The terminal reports the answers to the Privacy Host operator, which then updates the database. FIG. 14 shows a sample report screen which tabulates the configuration of devices and shows their current status.

Figure 12:
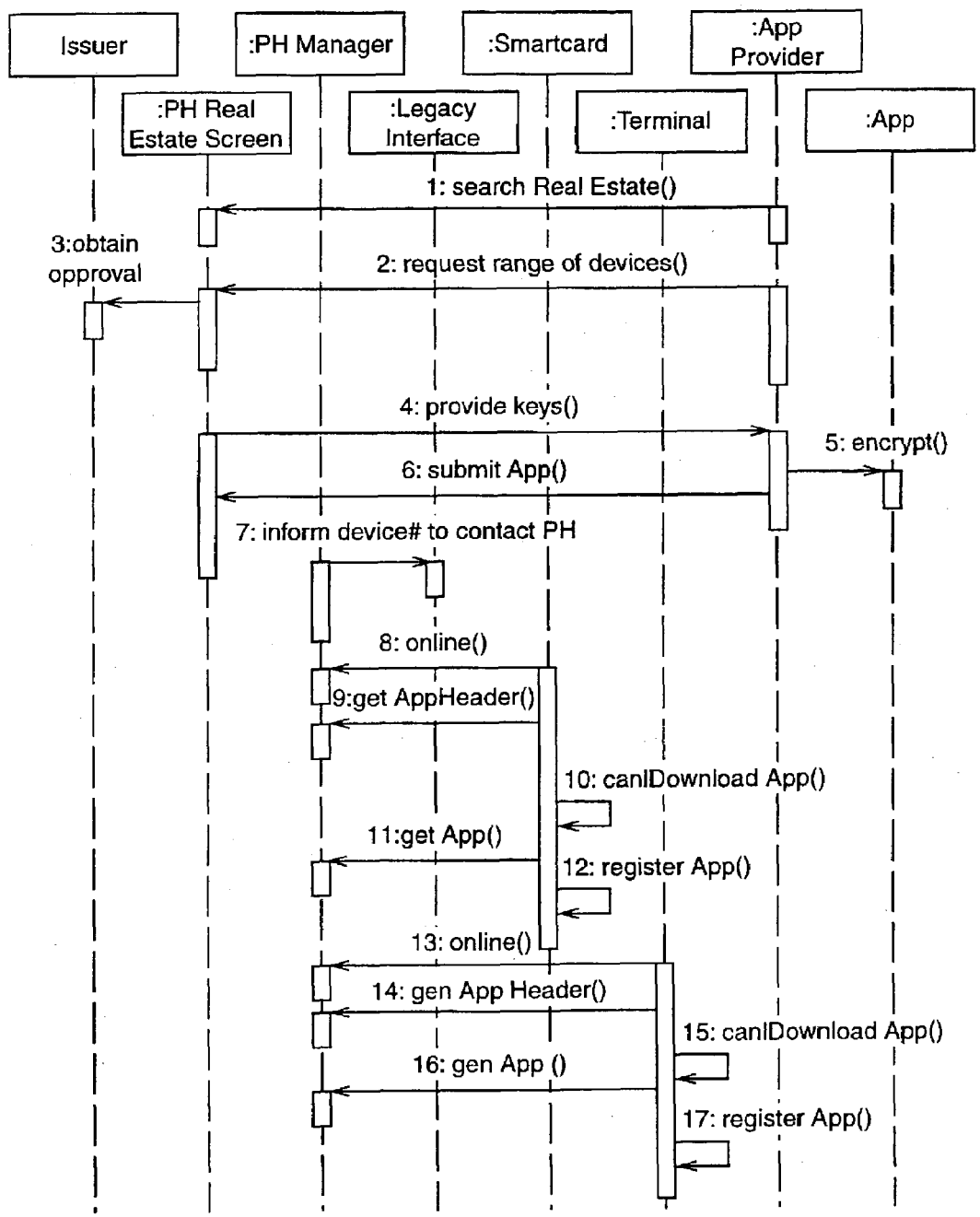
FIG. 12 is a schematic illustration of the interaction of devices when an application provider wishes to add a new application to devices.

FIG. 12 illustrates a more complex process, in which a selection of cards have a debit application loaded, and an application provider wishes to add a loyalty application. The vertical lines represent elements of the system, similarly to FIG. 9. The application provider conducts a search (1), and on the basis of the results requests permission to load on certain devices (2). After approval is obtained (3), the public encryption keys are provided (4), the application is encrypted (5), and is then submitted to the Privacy Host manager via the real estate screen (6). The Privacy Host manager sends a signal to the legacy interface requesting the (or each specified) device to contact the Privacy Host manager (7). When the device is inserted into a terminal and is online, it signals the Privacy Host manager and sends a request to get the application (9). This is then downloaded from via the terminal (10,11,12). The terminal then sends a similar request to download the terminal application for the loyalty scheme (13-17).

FIG. 13 shows a sample screen report of applications which have been authorised for downloading, but have not yet been loaded.

Device Access Control

The ALCS needs to control who has access to which devices. The devices act as a security gate to the real-estate. It is necessary for the application provider to be given permission to access a particular set of devices before they are permitted to become lessees of device real-estate and deposit applications for execution.

The ALCS System will keep track and manage access permissions for the different groups of devices in accordance with arrangements in place between the various parties.

In most cases the owner of a terminal is not necessarily the issuer of the smartcard which is being used in the terminal. The ALCS will need to cater for all the different access scenarios.

It is envisaged that ALCS card and terminals users will fall into one of several categories:

Issuers—Can have applications residing on the devices and extra permissions.
Tenants—Will have applications residing on the devices and permission to use all the card services.
Members—Can use the device services but have no applications physically residing on a device. (For example a smartcard member may be able to use the encryption facilities of the card from an application residing on a terminal).
Visitors—Can only use any publicly available services and cannot have any code residing on devices. Such a public service may for example be the use of a terminal's modem functionality.

Services for Visitors could be anything ranging from proprietary to a standards based service. The distinguishing factor is that the ALCS will not be involved in the management of any such miscellaneous services, as it does not involve applications residing in non-volatile memory.

Billing

The ALCS will charge lessees for their use of Card Real Estate and terminal real estate as per agreements. In addition the ALCS will facilitate the charging of a fee against revenue for the service it provides. The system contemplates multiple layers of billing, and that Periodic Bill reports and charges will be sent to participants. These aspects may be implemented via conventional billing software based on reports sent from the Privacy Host manager.

Advertising Management

The system can readily provide facilities for advertising to appear on terminal screens via applications. The rights to use these advertising facilities and the cross-advertising agreements that will have been agreed to by the different parties, will be managed, executed and adhered to by the ALCS.

Constraints

Various practical constraints will apply to the system, some of which are set out below, and need to be considered in any practical implementation. Some terminals will not be on-line and will not support dial-in functionality. This may limit the range of applications that can be downloaded to them. In addition a smartcard, can only have a new application loaded onto it after it has been inserted onto a terminal by a user.

Measures will need to be put in order to ensure that periodically at least, these devices can come on-line. Such measures include system interfaces with a terminal transaction acquirer. This will permit the ALCS to use the acquirer's link with the terminal as a means of contacting the unit. Alternatives include periodic call ups by a terminal to the ALCS Server, and inducements to card holders to occasionally insert their smartcard into an on-line terminal for updating.

Existing terminal applications to a large or smaller extent may have to be re-written in order for them to make use of the ALCS functionality. Existing non-modified applications will be classified as legacy and the ALCS architecture will ensure that they can execute in their present form. They will not though be managed by the ALCS system. Existing multi-application smartcard based applications will be able to take part in the ALCS unmodified.

The ALCS system will make a best effort to ensure that applications only execute and take up the memory space they have paid for. In addition the ALCS will try to ensure that applications do not infringe on each other. To enforce these requirements though, the ALCS system needs support from the device operating system and hardware. A Multos based smartcard environment, can support these requirements and thus the ALCS will make use of them. Other terminal hardware and operating systems may not offer this level of support and thus the ALCS will only be able to make a best effort attempt at safeguarding device space and applications.

It will be appreciated that many modifications and variations are possible within the spirit and scope of the present invention.

The invention claimed is:

1. A process for arranging the lease of capacity on one or more smartcards for utilization by an application provider, for use in an environment including a plurality of smartcards and terminals, a plurality of host systems each adapted to interact with some or all of the smartcards and terminals, said smartcards and terminals including a multiple application operating system, and a system including at least card software located on said smartcards, terminal software located on said terminals, control software located on one or more remotely located processing devices, and a database in communication with at least said remotely located processing devices, said database including details of which applications are permitted to be loaded onto which smartcards or terminals, said process including the steps of:

(a) the application provider requesting a search, using a set of user defined criteria, of said database that locates terminals or smartcards available to the application provider to load an application;
(b) the control software conducting a search and returning a report to the application provider;
(c) the application provider confirming renting of space to the control software;
(d) the control software requesting approval from the one or more smartcard or terminal owners for the application provider to rent space;
(e) the smartcard or terminal owner sending an approval to the control software; and (f) the control software sending a confirmation that the lease has been approved to the application provider.

2. The process according to claim 1, wherein the process further includes the steps of:
   (g) the control software sending an encryption key to the application provider to enable their submission of their application for downloading to the specified smartcards or terminals;
   (h) the application provider sending a copy of their application encrypted using the encryption key to the control software; and
   (i) the control software updating the database so that it indicates that the application is to be loaded onto the specified smartcards or terminals when next they are online with the system.

3. A process for arranging the lease of capacity on one or more smartcards for utilization by application provider, for use in an environment including a plurality of smartcards and terminals, a plurality of host systems each adapted to interact with some or all of the smartcards and terminals, said smartcards and terminals including a multiple application operating system, and a system including at least card software located on said smartcards, terminal software located on said terminals, control software located on one or more remotely located processing devices, and a database in communication with at least said remotely located processing devices, said database including details of which applications are permitted to be loaded onto which smartcards or terminals, said processing further including the steps of:
   a) the application provider requesting a search of said database, using a set of user defined criteria, that locates terminals or smartcards on which the application provider is able to load an application;
   b) the application provider receiving a report based on a search conducted by the control software;
   c) the application provider confirming renting of space to the control software; and
   d) the application provider receiving confirmation from the control software that the lease has been approved by the smartcard or terminal owner.

4. The process according to claim 3, wherein the process further includes the step of:
   e) the application provider receiving an encryption key from the control software to enable their submission of their application for downloading to the specified smartcards or terminals; and
   f) the application provider sending to the control software, a copy of their application encrypted using the encryption key.

5. A process for arranging the lease of capacity on one or more smartcards for utilization by an application provider, for use in an environment including a plurality of smartcards and terminals, a plurality of host systems each adapted to interact with some or all of the smartcards and terminals, said smartcards and terminals including a multiple application operating system and a system including at least card software located on said smartcards, terminal software located on said terminals, control software located on one or more remotely located processing devices, and a database in communication with at least said remotely located processing devices, said database including details of which applications are permitted to be loaded onto which smartcards or terminals, said processing further including the steps of:
   a) the control software receiving a request from the application provider to conduct a search of the database, using a set of user defined criteria in order to locate terminals or smartcards available to the application provider to load an application;
   b) the control software conducting a search and transmitting a report based on the results of the search to the application provider;
   c) the control software receiving a confirmation of the renting of space from the application provider;
   d) the control software requesting approval from the one or more smartcard or terminals owners for the application provider to rent space;
   e) the control software receiving an approval from the smartcard or terminal owners; and
   f) the control software sending a confirmation to the application provider that the lease has been approved.

6. The process according to claim 5, wherein the process further includes the steps of:
   g) the control software sending an encryption key to the application provider to enable their submission of their application for downloading to the specified smartcards or terminals;
   h) the control software receiving from the application provider, a copy of the application provider's application, encrypted using the encryption key; and
   i) the control software updating the database so that it indicates that the application is to be loaded onto the specified smartcards or terminals when next they are online with the system.

* * * * *